United States Patent
Feller

(10) Patent No.: US 7,559,257 B1
(45) Date of Patent: *Jul. 14, 2009

(54) MAGNETIC FLOW PROBE WITH CONDUCTIVE TIP

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

This patent is subject to a terminal disclaimer.

(21) Appl. No.: 12/247,302

(22) Filed: Oct. 8, 2008

Related U.S. Application Data

(63) Continuation-in-part of application No. 12/030,950, filed on Feb. 14, 2008, now Pat. No. 7,437,945.

(51) Int. Cl.
*G01F 1/58* (2006.01)
(52) U.S. Cl. .................... 73/861.12; 73/861.15
(58) Field of Classification Search ............... None
See application file for complete search history.

(56) References Cited

U.S. PATENT DOCUMENTS

| 3,712,133 | A | | 1/1973 | Westersten |
| 4,346,604 | A | * | 8/1982 | Snook et al. ............. 73/861.12 |
| 5,691,484 | A | * | 11/1997 | Feller .................... 73/861.13 |
| 5,970,799 | A | | 10/1999 | Griessmann et al. |
| 6,241,383 | B1 | | 6/2001 | Feller et al. |
| 6,530,285 | B1 | | 3/2003 | Feller |

* cited by examiner

*Primary Examiner*—Harshad Patel
(74) *Attorney, Agent, or Firm*—David Kiewit

(57) ABSTRACT

Problems of instability and non-linearity in probe-type magnetic flow meters are ameliorated by either or both of a conductor coating connecting a tip portion of the probe with a supporting probe stem and either a shrouding arrangement or skewed end plates parallel to the flow direction that are arranged adjacent to the sensing electrodes and that act to straighten and confine fluid flowing past the electrodes.

12 Claims, 3 Drawing Sheets

MAGNETIC FLOW PROBE WITH CONDUCTIVE TIP

BACKGROUND OF THE INVENTION

1. Field of the Invention

This application relates to magnetic flow sensing probes used in electromagnetic, or Faraday, flow meters, and is a continuation-in-part of the inventor's U.S. patent application Ser. No. 12/030,950.

2. Background Information

The rate of flow of a conductive fluid can be determined by measuring an electrical potential difference developed in the fluid as the fluid moves through a magnetic field. The potential difference is sensed by at least one pair of electrodes contacting the liquid and spaced apart from each other along a line that is nominally orthogonal to both the direction in which the flow is being measured and a magnetic field produced by a magnet. Some instruments of this sort are configured as in-line flow meters in which the electrodes and magnets are either built into or are very close to the wall of a pipe through which the fluid flows. Other instruments of this type are configured as insertion probes in which the electrodes are or adjacent a free end of the probe. When the probe is inserted into a flowing fluid the measurement is made at some selected distance from whatever pipe wall or other support member is used to anchor the probe in place.

A concern with flow probes in general is that the flow impedance of the probe measurement head, can cause the probe to vibrate. This vibration may lead to non-linear response or to mechanical failure.

A particular concern related to magnetic flow probes has been that fluid flow distribution in the neighborhood of the electrodes may not remain uniform because of the flow obstruction caused by the probe head itself. At low flow rates the fluid tends to change course in the vicinity of the head and may be deflected away from the electrodes so as to reduce the measured signal. This can result in a nonlinear relation between the flow-generated electrode signal and the flow rate even in the absence of perceptible vibration. Other nonlinearities may be caused at intermediate and higher velocities by the fluid impinging on portions of the probe distal from the electrodes. Additional nonlinearities due to the proximity of the pipe wall to the head may also occur.

BRIEF SUMMARY OF THE INVENTION

An aspect of a preferred embodiment the present invention is that it provides a way to reduce nonlinearities in the observed relation between fluid flow rate and output signal in a magnetic flow meter by controlling flow past a set of electrodes. To this end, one embodiment of the invention provides a paddle-shaped electromagnetic flow probe for measuring a rate of flow of a fluid along a flow direction. This probe comprises a stem portion that can be anchored to a fixed support and a blade-like measurement head supporting at least one pair of electrodes exposed on at least one of the faces of the blade and spaced apart along an axis of the probe. In use, the stem portion is inserted into the fluid so that the axis of the probe is transverse to the flow direction. In this orientation the two opposing electrically insulating head faces that support the electrodes are aligned along the flow direction. In addition, there is preferably a magnet within the head that is arranged to provide a magnetic field extending outwardly from its faces. There are also two end plate portions disposed adjacent respective ends of the head portion. Each of the end plate portions extends outwardly from a respective face of the head portion so that each end plate portion is aligned parallel to the flow direction. The end plates may be flat and perpendicular to the axis of the probe, but in particular preferred embodiments the end plate portions may be either curved or flat and are skewed with respect to the axis of the probe so that the plate is tilted toward the blade face. In these cases an edge of the plate distal from the blade face is closer to that face than it would be if the plate were flat and perpendicular to the axis of the probe.

In another preferred embodiment a continuous shrouding portion extends from one end of the blade face to the other. This shrouding portion can be viewed as being formed by extending curved end plates from opposite ends of a blade face until those plates meet near the middle of the face. Thus, the invention encompasses end plate structures that may be flat or curved and that may extend far enough along the blade face to form a shrouding portion.

Another aspect of preferred embodiments of the present invention is that they provide improved grounding for a magnetic flow probe. To this end, one aspect of the invention is that it provides an electromagnetic flow probe having a paddle-like shape and comprising an electrically conductive stem portion for insertion into the fluid so that an axis of the probe is transverse to the flow direction and so that two opposing electrically insulating faces of a head portion of the probe are aligned along the flow direction. In this embodiment there is at least one pair of electrodes exposed on at least one of the faces of the head portion of the probe and spaced apart along an axis of the probe. In addition, a magnet is disposed within the head portion and arranged to provide a magnetic field extending outwardly from its faces. Moreover, an electrically conductive coating disposed on at least one of a leading or a trailing edge portion of the head, as well as on a tip portion of the head, may be electrically connected to the stem.

If a surface of each plate distal from the electrodes is made electrically conductive and is electrically grounded, the plates provide a substantial amount of surface area for electrically grounding the fluid. That area is particularly effective because it is not localized. If the electrical connections between the plates and stem, or other grounding connections, are exposed to the fluid, the total grounding area is increased further. The plate surfaces adjacent the electrodes may be electrically insulated to minimize the shunting effect on the flow generated electrode voltages.

Yet another aspect of some embodiments of the present invention is a flow plate structure operable to suppress vibrations of the probe head. The flow obstruction offered by the probe head and stem, characteristic of a bluff body, typically produces vortices that tend to vibrate the stem perpendicular to a plane defined by the flow & the stem. Providing an extended paddle-like face aligned with the flow inhibits this process. The provision of end plates further inhibits vibration and Improves measurement linearity by straightening the fluid flow streamlines, capturing flow near the electrodes, and coupling the head more tightly to the fluid. Moreover, either or both of the leading and trailing edges of the blade and of the end plates may be sharply pointed or otherwise shaped to reduce the generation of vortices. It may be noted that providing a sharp edge can reduce vortex generation even in the absence of end plates.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF A PREFERRED EMBODIMENT

Figure 1:
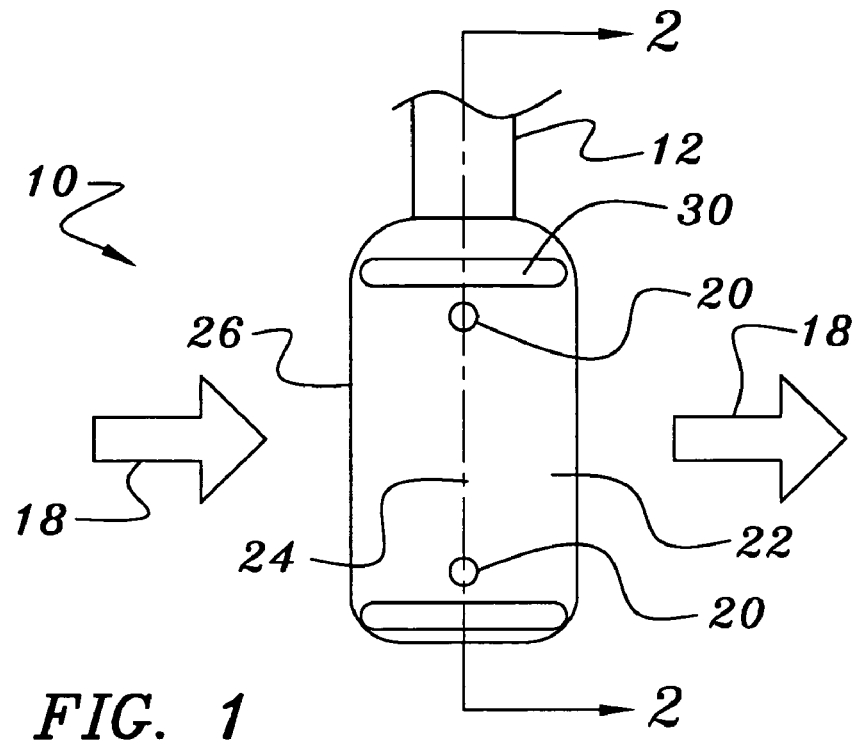
FIG. 1 is an elevational view of a portion of magnetic flow probe of the invention, the view taken perpendicular to both a direction of fluid flow and of a face of a probe head.

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of the description, it may be noted that the term 'paddle-shaped' and paddle-like generally refer to a shape analogous to an oar or single-ended canoe paddle comprising a shaft or stem having a blade-like head at one end thereof. These terms may also refer to a similar sort of structure disposed within a partially open housing or shroud, where the shrouded blade has no common analogy in boating. In this usage, the term 'blade-like' implies a shape having two faces that may be flat or lenticular, that extend along an axis of a probe stem and that are oriented parallel to a flow direction when the sensor is in use. The blade-like shape further implies the presence of leading and trailing edge portions, which may be sharp and of minimal extent or which may be nearly as wide as the maximum thickness of the blade-like head. The edge portions are oriented transverse to the flow direction when the blade faces are parallel to it.

A magnetic flow probe 10 may have a paddle-like shape comprising a stem portion 12 and a blade-shaped sensing head portion 14 that contains a magnet 15 for generating a magnetic field transverse to a fluid flow direction 18. The magnet is generally an electromagnet that comprises windings 16 and that may comprise a core 17. The head supports at least one pair of sensing electrodes 20 spaced apart along a direction that is ideally orthogonal to both the flow direction and the magnetic field, but that may be skewed from either of them. These electrodes 20 are necessarily electrically insulated from each other so that they can be used to measure a voltage representative of the fluid flow.

Although a preferred sensing head of the invention comprises an internal magnet, it may be noted that one could omit that magnet, or omit the windings and leave a magnetic core within the blade. In these cases one would provide a magnetic field from outside the pipe in which the sensing head was mounted.

In a preferred embodiment a blade-like sensing head 14 has two generally parallel faces 22 that, when the probe is installed, are selectively oriented along the flow direction 18. The length of these faces 22, as measured along the probe axis 24, is selected to provide adequate spacing for the voltage sensing electrodes. In a preferred embodiment a pair of electrodes is arranged on each of the faces 22.

The size of a magnet embedded in the sensing head sets a limit on the thickness of the head as measured in a direction perpendicular to the faces. In order to minimize flow disturbances caused by the presence of the head, the flow-facing edge portions 26 of the head may be rounded or, preferably, sharpened or pointed. Moreover, the entire blade-shaped head may have a lenticular cross-section with very narrow leading and trailing edge portions. Even though flow disturbances can be reduced somewhat by streamlining the head, the fluid flow streams take the route of least resistance and may deviate from parallel paths because of the obstruction represented by the head. At higher flow rates inertial effects tend to keep these flow paths more nearly parallel, and this change in flow distribution with flow rate commonly leads to measurement nonlinearities.

Figure 2:
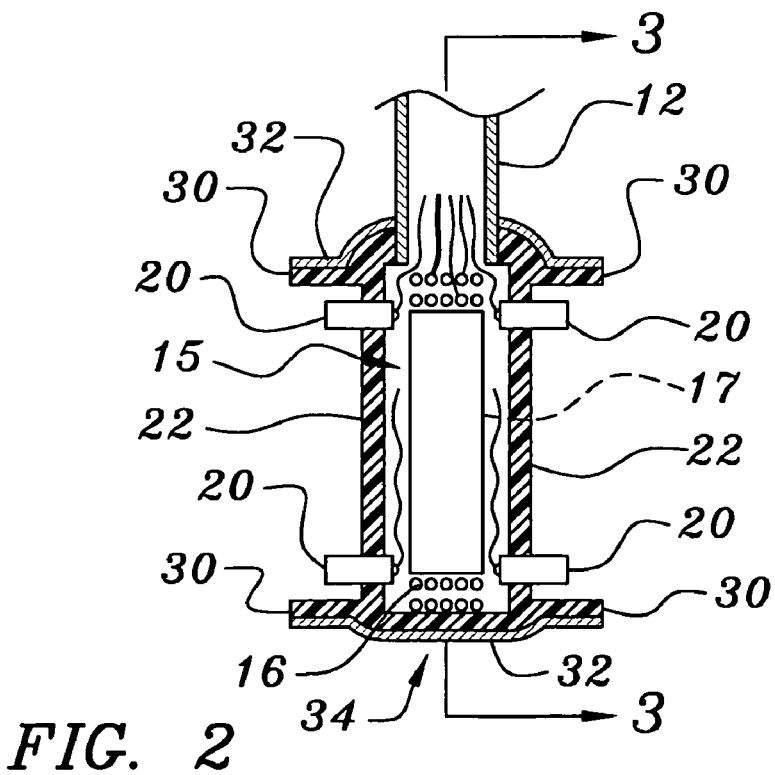
FIG. 2 is a cross-sectional view of a probe similar to that of FIG. 1, the view taken as indicated by the arrows 2-2 in FIG. 1, wherein the dimensions in the face-to-face direction have been exaggerated in the interest of clarity of presentation.
Figure 4:
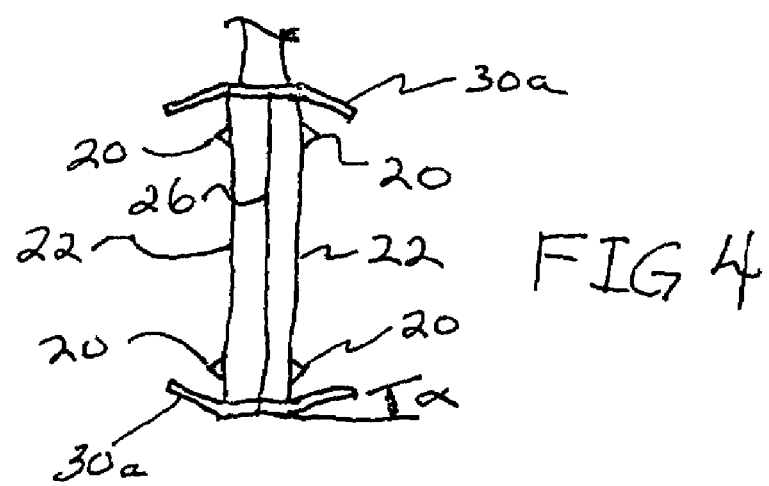
FIG. 4 is a partly schematic elevational view taken along a flow direction of an embodiment of the invention having slanted end plates.
Figure 5:
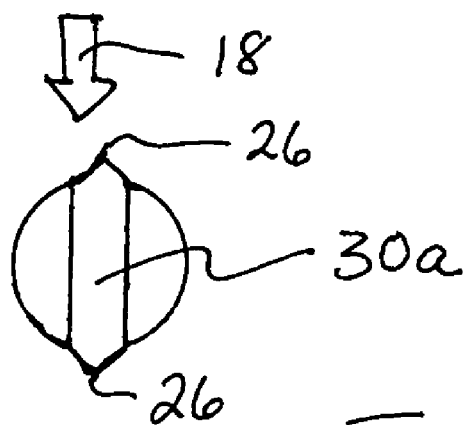
FIG. 5 is an elevational view of a distal end of the embodiment of FIG. 4, the view taken along the axis of the flow probe and perpendicular to the flow direction.

In a preferred embodiment of the invention a paddle-shaped sensing head 14 comprises end plates 30 extending outwardly from each face. The end plates may be formed integrally with the head, as depicted in FIG. 2, or made separately and attached to the sensing head by adhesives, welding, or other attachment arrangements known in the art. The maximum lateral extent of these plates, as noted above, is generally limited by the diameter of a valve or other opening though which the probe is inserted into a pipe 28. These plates act to confine the flowing fluid and prevent flow streams from deviating from parallel paths. This confining action aids in isolating the flow paths from proximity effects of pipe walls so that the probe may be located closer to a pipe wall as probe calibration is less affected by the size of the pipe in which it is mounted. Moreover, this sort of flow confinement has been observed to suppress flow-induced vibration of the probe, which is known to lead to measurement error and, in severe cases, to mechanical failures. In a particular preferred embodiment, depicted in FIG. 4, the end plates 30a are skewed with respect to the axis of the probe 24 by an angle α that may be on the order of 15° in order to improve flow confinement. This angle, as shown, provides that a portion of the end plate distal from the blade than it would be if the plate were flat and perpendicular to the axis of the probe. Moreover, the end plates 30a and blade 25 may have sharpened or pointed leading and trailing edges, as depicted in FIG. 5, to reduce vortex generation.

Figure 6:
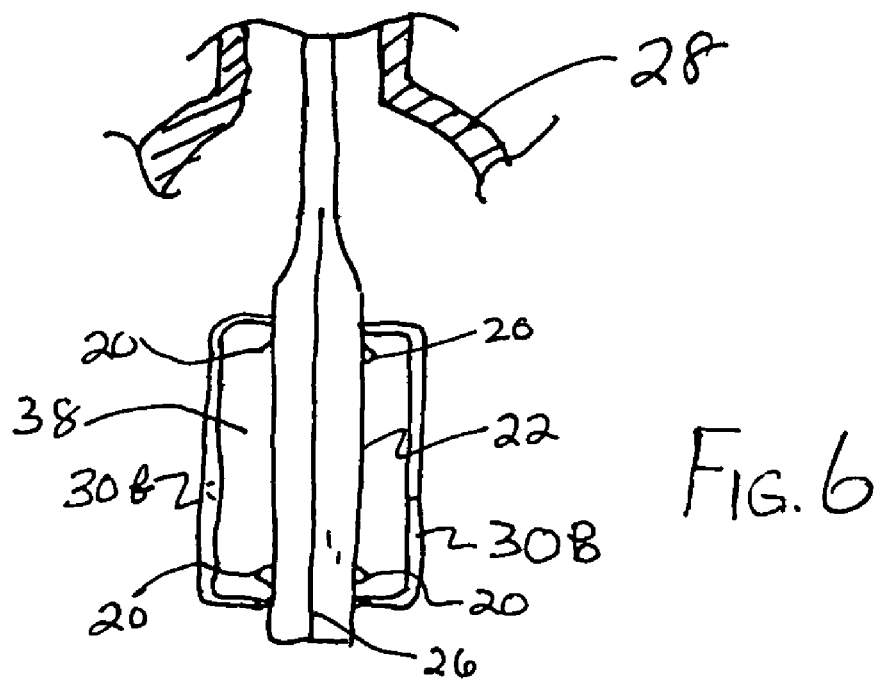
FIG. 6 is an elevational view, taken along a flow direction, of another embodiment of the invention in which the end plates are merged to form a shroud portion of the flow probe.

In yet another preferred embodiment, depicted in FIG. 6, the flow of the portion of the fluid being sensed is further confined to a gap 38 between the blade face 26 and a shrouding portion 30b. The shrouding portion 30b can be conceptually viewed as being formed by extending top and bottom curved end plates until they meet in the center, or, equivalently, constructing top and bottom end plates and then connecting them with a wall disposed parallel to the blade. It may be noted that although this description may provide a conceptual framework for understanding the shape of the shroud it should not be read as an actual way of constructing a flow probe of the sort shown in FIG. 6.

Figure 3:
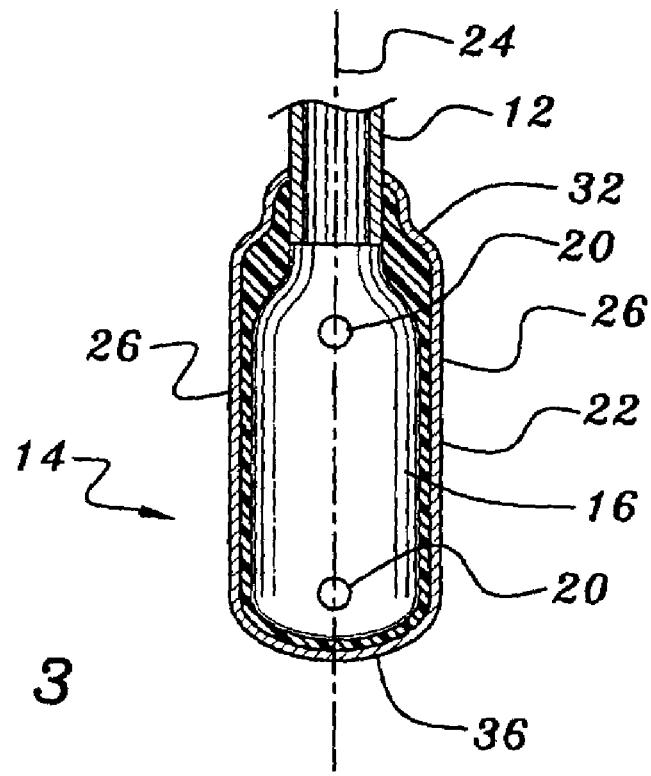
FIG. 3 is a cross section the flow probe of FIGS. 1 and 2 from which the electromagnet has been omitted in the interest of clarity, the section indicated by the arrow 3-3 in FIG. 2.

As noted above, an additional concern with magnetic flow probes is that of adequately grounding the fluid in the vicinity of the probe head 14. In a preferred embodiment of the invention, the provision of an electrically conductive coating 32 on portions of the sensing head leads to improved grounding. In particular, an increased fluid grounding area is afforded by putting a conductive coating on the surfaces of the end plates that are distal from the electrodes and connecting those surfaces to the electrically conducting surface of the stem portion of the probe. In one tested embodiment the distal surfaces of the end plates were made of polysulfone coated with a conductive filled polymer composite comprising epoxy resin and nickel powder as a filler. A conducting ribbon of this composite was formed on the leading and trailing edge faces 26 of the blade-like head 14 in order to electrically connect the stem 12 to the tip portion 34 of the head distal from the stem. In a particular preferred embodiment, the conductive coating was formed with a gap 36, as depicted in FIG. 3, at the tip 34 of the sensing head. This gap, which is aligned parallel to the axis of the magnet winding, avoids having a highly conductive loop appearing as a shorted secondary turn to the electromagnet.

Although the tested embodiment provided satisfactory performance, other fabrications are also possible. These comprise, without limitation, the use of metallic end plates having an electrically insulating coating on the side adjacent the electrodes as well as the use of metal foil banding to form electrical connections between the portion of the head adjacent to the stem and the tip portion of the head that is distal therefrom.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. An electromagnetic flow probe for measuring a rate of flow of a fluid along a flow direction, the probe having a paddle-like shape, the probe comprising:
    a stem portion for insertion into the fluid so that an axis of the probe is transverse to the flow direction and so that two opposing electrically insulating faces of a blade-shaped head portion of the probe are aligned along the flow direction;
    at least one pair of electrodes exposed on at least one of the faces of the head portion of the probe and spaced apart along the axis of the probe; and
    end plate portions disposed adjacent respective ends of the head portion, each of the end plate portions comprising surfaces aligned parallel to the flow direction, each of the end plate portions extending outwardly from the head portion and skewed with respect to the axis of the probe.

2. The flow probe of claim 1 wherein each of the end plate portions comprises a curved surface.

3. The flow probe of claim 1 comprising two pairs of electrodes respectively disposed on the two faces of the head portion.

4. The flow probe of claim 1 further comprising a magnet disposed within the blade-shaped head portion.

5. The flow probe of claim 1 so that an edge of each end plate portion that is distal from the axis is closer to an adjacent face than it would be if the plate were flat and perpendicular to the axis of the probe.

6. An electromagnetic flow probe for measuring a rate of flow of a fluid along a flow direction, the probe having a paddle-like shape, the probe comprising:
    a stem portion for insertion into the fluid so that an axis of the probe is transverse to the flow direction and so that two opposing electrically insulating faces of a blade-shaped head portion of the probe are aligned along the flow direction;
    at least one pair of electrodes exposed on at least one of the faces of the head portion of the probe and spaced apart along the axis of the probe so that each at least one pair comprises a proximal electrode more proximal to the stem and a distal electrode more distal from the stem; and
    at least one shroud portion comprising surfaces aligned parallel to the flow direction and spaced apart from a respective at least one of the faces of the blade portion to define at least one respective flow gap extending from a proximal end more proximal to the stem than the respective proximal electrode to a distal end more distal from the stem than the respective distal electrode so that both electrodes of the at least one pair thereof are disposed within the flow gap.

7. The flow probe of claim 6 comprising two pairs of electrodes respectively disposed on the two faces of the head portion, each of the two pairs of electrodes disposed within a respective flow gap defined by a respective shroud portion.

8. The flow probe of claim 6 further comprising a magnet disposed within the blade-shaped head portion.

9. A method of measuring a rate of flow of a fluid along a flow direction, the method comprising the steps of:
    providing a flow probe comprising:
        a blade-shaped head portion having two opposing electrically insulating faces;
        at least one pair of electrodes exposed on a respective one of the faces, the pair of electrodes spaced apart along an axis of the probe; and
        end plate portions disposed adjacent respective ends of the one of the faces, each of the end plate portions aligned parallel to the flow direction and extending outwardly from the one of the faces;
    inserting the flow probe into the fluid so that the axis of the probe is transverse to the flow direction and so that the faces are aligned along the flow direction;
    providing a magnet for generating a magnetic field extending outwardly from the at least one face; and
    measuring a voltage between the electrodes of each at least one pair thereof, the voltage representative of the rate of flow of the fluid.

10. The method of claim 9 wherein the magnetic field is provided by a coil disposed within the blade-shaped head portion.

11. The method of claim 9 wherein the magnetic field is provided by means not disposed within the blade-shaped head portion.

12. The method of claim 9 wherein the flow probe comprises at least one shroud comprising a respective at least one surface aligned parallel to the flow direction and spaced apart from a respective at least one face of the blade portion so as to define at least one respective flow gap.

* * * * *